Jan. 7, 1941.  W. H. COBB  2,227,425
FENDER GUARD
Filed July 18, 1939  2 Sheets-Sheet 1
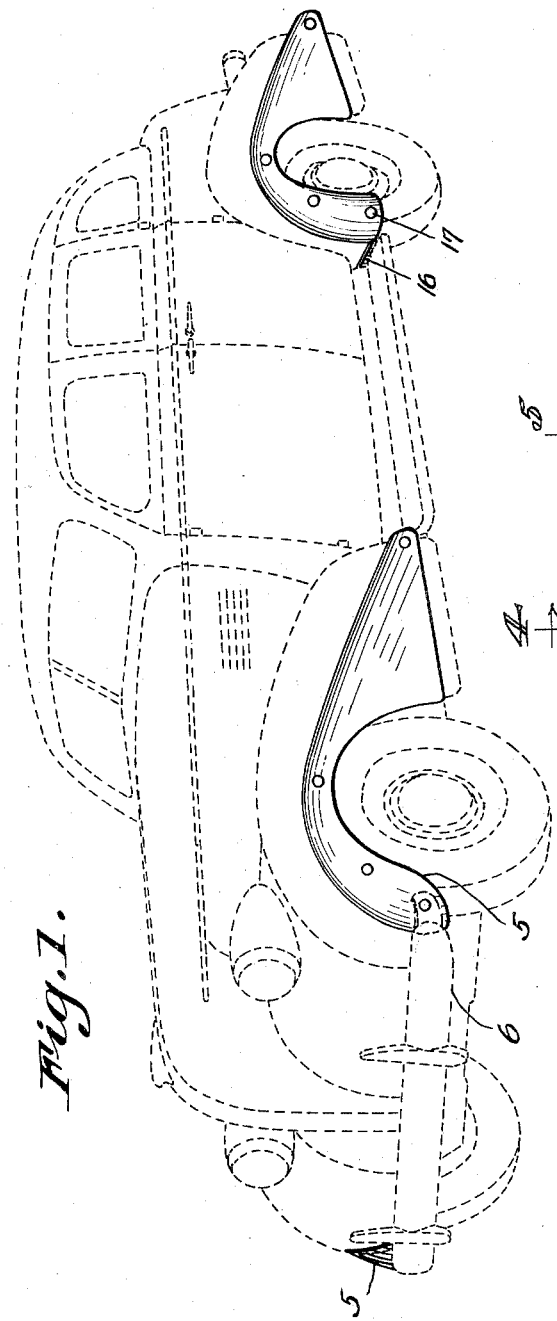
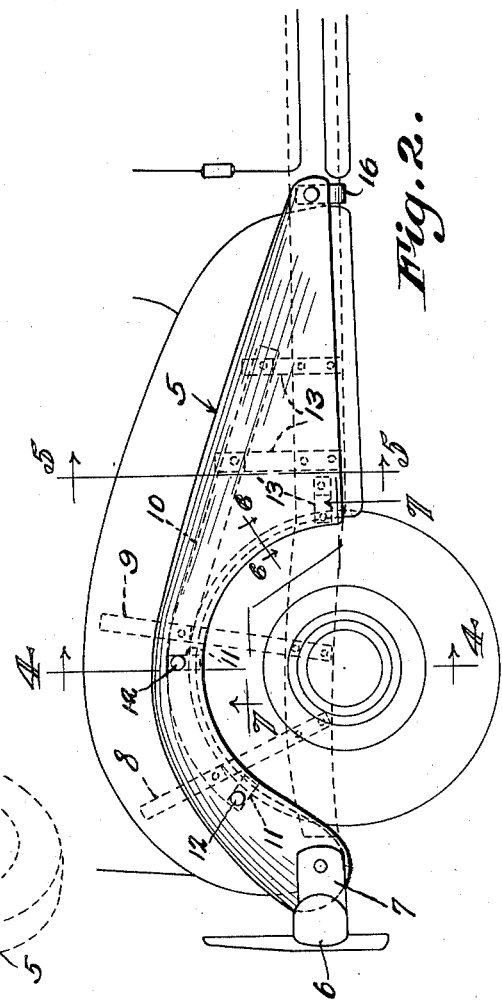
W. H. Cobb
INVENTOR.
BY
ATTORNEYS.

Jan. 7, 1941.  W. H. COBB  2,227,425
FENDER GUARD
Filed July 18, 1939  2 Sheets-Sheet 2
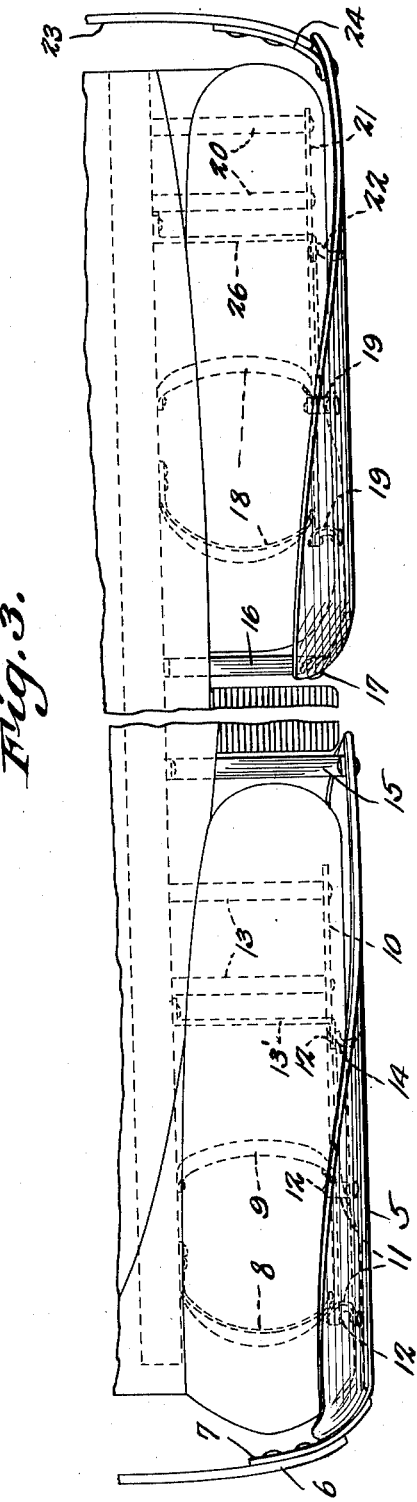
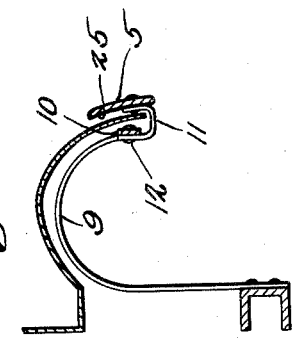
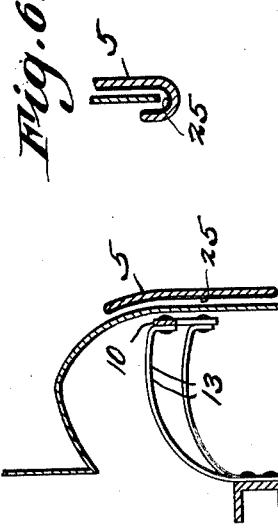
W. H. Cobb
INVENTOR.
BY
ATTORNEYS.

Patented Jan. 7, 1941

2,227,425

UNITED STATES PATENT OFFICE 2,227,425

FENDER GUARD

William H. Cobb, Jacksonville, Fla.

Application July 18, 1939, Serial No. 285,185

1 Claim. (Cl. 293—57)

The invention relates to fender guards, the primary object of the invention being to provide a shield which will reduce the seriousness of damage to passengers and motor vehicles, due to side swiping and various other types of accidents frequently occurring in motoring.

An important object of the invention is to provide means for preventing the bumpers of a vehicle being parked, from hooking the fenders of the adjacent parked cars.

Another object of the invention is to provide a guard or shield of this character which may be readily and easily mounted, without the necessity of resorting to structural changes in the fender construction.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawings:

Figure 1 is a perspective view illustrating guards or shields constructed in accordance with the invention as mounted on a motor vehicle.

Figure 2 is a side elevational view thereof.

Figure 3 is a plan, illustrating the guards or shields as positioned.

Figure 4 is a sectional view taken on line 4—4 of Figure 2.

Figure 5 is a sectional view taken on line 5—5 of Figure 2.

Figure 6 is a sectional view taken on line 6—6 of Figure 2.

Figure 7 is a sectional view taken on line 7—7 of Figure 2.

Referring to the drawings in detail, the guard or shield used in connection with the front fenders of a motor vehicle, is indicated generally by the reference character 5, the guard or shield 5 being constructed of hard sheet steel material of sufficient thickness to withstand hard blows and curved and shaped to conform somewhat to the curvature and shape of the fender with which it is used to guard.

The body portion is of a length so that the forward end thereof extends to a point adjacent to the end of the bumper at the front of the vehicle, where it is bolted or otherwise secured to the bumper, which in the present showing is indicated by the reference character 6, by means of the metal strap 7 which is shown as riveted to the guard.

Curved brace arms of stout spring steel material as indicated at 8 and 9 are secured to the side rails of the chassis of the vehicle, adjacent to the front end thereof the brace arms being spaced appreciable distances from the fender with which it is used.

The upper ends of the curved brace arms 8 and 9 are connected by the bar 10, so that the outer ends of the curved brace arms are securely held in proper spaced relation with respect to each other. U-shaped securing members 11 have one of their respective ends secured to the bar 10, at 12, the opposite ends of the U-shaped securing members extending over the free edge of the fender with which the device is used. The guard or shield is riveted to the outer ends of the U-shaped securing members where they support the guard or shield in proper spaced relation with the fender. The bar 10 extends to a point adjacent to the rear end of the fender, where it is connected with the arms 13 that are secured to the side rail of the chassis, and extend laterally therefrom.

A securing member indicated at 14 connects with the foremost arm 13', and is secured to the guard.

At the rear end of the guard or shield 5, is an arm 15 that has its inner end bolted to the side rail of the chassis of the vehicle, the outer end thereof extending at right angles, where it is bolted to the guard or shield 5, as clearly shown by Figure 3.

Throughout a portion of the length of the lower edge of the guard or shield, the guard or shield is bent upwardly as clearly shown by Figure 6, where it lies in spaced relation with the edge of the vehicle fender, with which the guard or shield is used.

The guard used in connection with the rear fenders of the vehicle is somewhat similar to the guard used with the front fenders, and as shown, the forward end of the guard is supported by means of the arm 16 which is bolted to the side rail of the chassis, and extends to a point adjacent to the guard, where it is secured, by means of the rivet 17.

Upwardly curved arms indicated at 18 are secured to the side rail of the chassis, the outer ends of the arms 18 being secured to the bar 21 which is of a length to extend to a point adjacent to the rear end of the fender.

U-shaped members 19 are secured to the bar 21 and fit around the edge of the fender in spaced relation therewith.

The bars 20 are bolted to the side rail of the chassis, and have their outer ends bolted to the bar 21, supporting the rear end of said bar. Directly in front of the bars 20 is a bar 26 that is secured to the chassis of the vehicle, the outer end of the bar 26 providing a support for the U-shaped securing member 22, which extends around one edge of the fender.

As clearly shown by Figure 3 of the drawings, the rear end of the rear guard extends over the end of the bumper 23 at the rear of the vehicle, where it is secured in position by means of the metal strap 24, which is shown as having one of its ends bolted to the bumper, the opposite end thereof being connected with the guard or shield.

It might be further stated that cushioning material such as indicated at 25, is secured to the inner surface of the guard or shield, to prevent damage to the fender, in the event that the guard or shield should receive a blow of sufficient force to cause the guard or shield to be bent inwardly to contact with the fender. The outer surface of the guard or shield will be chrome plated to withstand blows and side-swipes without showing ugly mars which would show on a painted surface.

From the foregoing it will be seen that due to the construction shown and described, I have provided a guard or shield which may be readily and easily mounted on a motor vehicle in such a way as to protect the fenders against damage by various types of accidents frequently occurring in motoring including the protection afforded in parking between other cars.

What is claimed is:

The combination with the fender of an automobile, of a fender guard comprising a supporting frame embodying a plurality of spaced upwardly and outwardly curved arms, connected with the side rail of the chassis of the automobile, the curved portions of the arms underlying the fender in spaced relation therewith, a bar connecting the free ends of said arms, U-shaped members connected with said bar connecting the arms, and disposed under the edge of the fender, a wide guard member shaped to conform to the shape of the fender, overlying the fender in spaced relation therewith and connected with the U-shaped members, and the lower edge of said guard member being curved inwardly and upwardly and fitted over the free edge of the fender in spaced relation therewith.

WILLIAM H. COBB.